United States Patent
Bubeck et al.

[19]

[11] Patent Number: 6,089,533
[45] Date of Patent: Jul. 18, 2000

[54] ARRANGEMENT HAVING AT LEAST ONE HYDRAULIC ACTUATOR

[75] Inventors: Helmut Bubeck; Thomas Laux, both of Markgröningen, Germany

[73] Assignee: Robert Bosch GmbH, Stuttgart, Germany

[21] Appl. No.: 09/099,774

[22] Filed: Jun. 19, 1998

[30] Foreign Application Priority Data

Jun. 20, 1997 [DE] Germany .......................... 197 26 225

[51] Int. Cl.⁷ ........................................ F17D 1/14
[52] U.S. Cl. .................. 251/75; 251/129.08; 137/599.07
[58] Field of Search ......................... 251/129.06, 129.08, 251/75; 137/599, 599.07

[56] References Cited

U.S. PATENT DOCUMENTS

| | | | |
|---|---|---|---|
| 3,937,248 | 2/1976 | Hutton | 137/599 X |
| 4,148,340 | 4/1979 | Hutton | 137/599 |
| 4,469,128 | 9/1984 | Petrimaux et al. | |
| 5,129,489 | 7/1992 | Majima et al. | 251/129.06 X |
| 5,313,871 | 5/1994 | Kaneko et al. | 137/601 X |
| 5,507,197 | 4/1996 | Devaud et al. | |
| 5,553,828 | 9/1996 | Jaenker | 251/129.06 X |
| 5,875,817 | 3/1999 | Carter | 251/129.08 X |

FOREIGN PATENT DOCUMENTS

| | | |
|---|---|---|
| 0704779 | 4/1996 | European Pat. Off. . |
| 0715108 | 6/1996 | European Pat. Off. . |
| 2823960 | 12/1979 | Germany . |
| 4341649 | 6/1995 | Germany . |

*Primary Examiner*—John Rivell
*Assistant Examiner*—Meredith H. Schoenfeld
*Attorney, Agent, or Firm*—Walter Ottesen

[57] ABSTRACT

The invention is directed to an arrangement having one or several hydraulic actuators. The arrangement is characterized in that the hydraulic actuators are realized, at in part, by utilizing bistable magnetic valves.

9 Claims, 2 Drawing Sheets

ARRANGEMENT HAVING AT LEAST ONE HYDRAULIC ACTUATOR

BACKGROUND OF THE INVENTION

Arrangements having at least one hydraulic actuator are used, for example, in automatic transmissions of motor vehicles but not exclusively. The hydraulic actuators are here needed to build up and/or to maintain pressures or difference pressures.

It is known to realize hydraulic actuators as magnetic valves.

The actuation of magnetic valves is effected by the activation or deactivation of an electromagnet provided in the valve. When electromagnets are activated and deactivated, current flows through the coils thereof and this causes the movement of an armature, more specifically, the pull-in or release (or reset) of an armature. This armature is operatively connected to the closure element of the valve and this element is moved with the armature. The position of the armature and of the closure element is essentially retained unchanged until the current is switched off. After the current is cut off, the armature and the closure element return to a defined start position.

The magnetic valves are actuated by a control apparatus contained within the arrangement. This control apparatus is an electronic transmission control apparatus or EGS if the magnetic valves are parts of a motor vehicle transmission. The control apparatus is therefore relatively large and must be dimensioned for high use and loss powers. This, in turn, makes the suitable accommodation of the control apparatus in the motor vehicle difficult and makes the arrangement complicated and inconvenient (or hard to handle).

SUMMARY OF THE INVENTION

It is an object of the invention to provide an arrangement having at least one hydraulic actuator which is so improved that the complexity for driving the hydraulic actuators is reduced to a minimum.

The arrangement of the invention incorporates hydraulic actuator means and includes: the hydraulic actuator means being a plurality of bistable magnetic valves ($3$-$1$, $3$-$2$ . . . $3$-$2^n$-$1$).

In the above arrangement, the hydraulic actuators are realized in that bistable magnetic valves are used at least in part.

The use of bistable magnetic valves to realize hydraulic actuators affords the advantage that they must be supplied with current only for a short time (pulse like) rather than continuously as is the case with the magnetic valves used conventionally. A short current pulse or voltage pulse is adequate in order to move the closure element of the magnetic valve from its one stable position into its other stable position and vice versa.

A consequence of the above is that the power output stages which are provided for the magnetic valve drive, must only be driven for a short time in each case whereby they can be designed for only short-term high powers and, independent of this, generate overall considerably less heat energy.

In this way, the unit usually containing the power output stage (in the case of motor vehicles, the control apparatus), can be of simpler configuration and considerably smaller than has been previously the case.

The complexity of driving the hydraulic actuators can be reduced to a very significant extent by using bistable magnetic values to realize the actuators.

The size of the unit incorporating the power output stages can be still further reduced when, in a manner different than up to the present time, a common power output stage is provided for several magnetic valves by which the assigned magnetic valves are simultaneously or sequentially actuated. Previously, each magnetic valve had a separate power output stage. The sequential actuation of bistable magnetic valves can be realized as a quasi simultaneous actuation of the same because the bistable magnetic valves must each be supplied with current for only a short time that is, in a very rapid sequence.

A further reduction of the unit incorporating the power output stages and a reduction of the heat generated therein can be achieved when the power output stage(s) is mounted outside of this unit in close proximity to the magnetic valves. Then the unit must only supply the set pulse or the reset pulse to drive the magnetic valve. As mentioned above, a precise simultaneous actuation of the bistable magnetic valves is not, as a rule, necessary. For this reason, the set and reset pulses can be sequentially transmitted. This, in turn, opens the possibility to keep the number of control lines lower than the number of magnetic valves to be driven. The set and reset pulses from the control apparatus to the power output stage(s) are transmitted via these control lines. A cable harness extends from the control apparatus to the magnetic valves to be driven and, in the manner outlined above, this cable harness can be configured to be at least smaller in part (lower number of lines). This reduction is then provided in the region between the control apparatus and the power output stages. Independently of the foregoing, the lines in the region between the control apparatus and the power output stages can also have a reduced cross section because only control signals must be transmitted and no high power.

BRIEF DESCRIPTION OF THE DRAWINGS

The invention will now be described with reference to the drawings wherein.

DESCRIPTION OF THE PREFERRED EMBODIMENTS OF THE INVENTION

The hydraulic actuators discussed hereinafter with respect to the invention are hydraulic actuators which are provided in an automatic transmission of a motor vehicle. However, the invention is not limited hereto. The hydraulic actuators can also be components of any other desired arrangement.

In the embodiment shown, the hydraulic actuators operate to build up and/or maintain a pressure or a difference pressure; but, they are not limited to this purpose. The hydraulic actuators can also be utilized for any other desired purpose.

Figure 1:
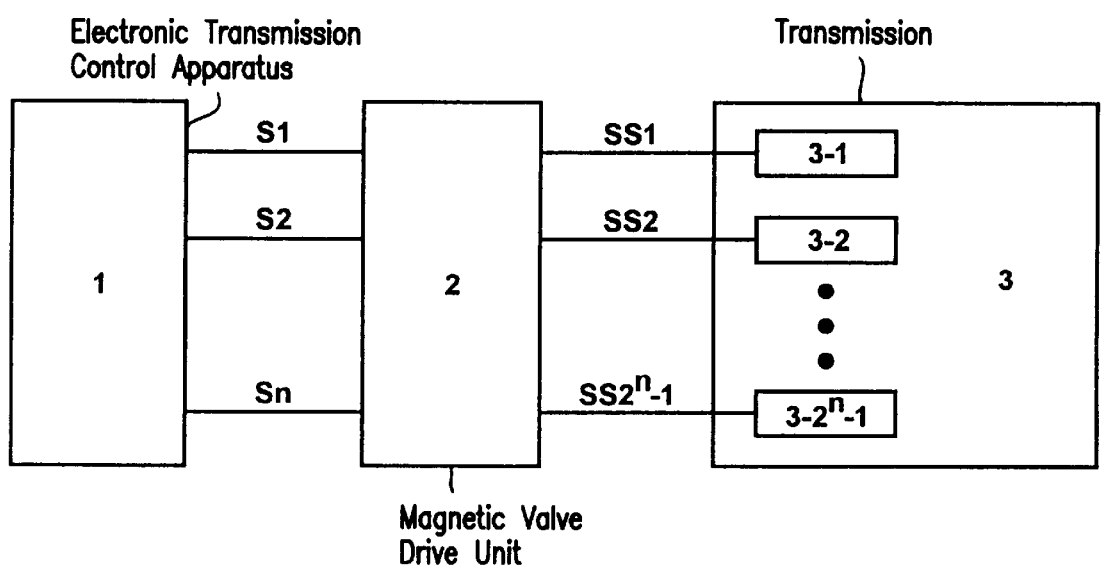
FIG. 1 is a block circuit diagram of an embodiment of the arrangement according to the invention; and, FIG. 2 is a schematic showing one possible inner assembly of the arrangement of FIG. 1.

In the arrangement shown in FIG. 1, $2^n$-$1$ hydraulic actuators $3$-$1$, $3$-$2$, . . . $3$-$2^n$-$1$ are provided. The actuators are components of a transmission $3$ (an automatic transmission of a motor vehicle) and are driven and actuated by an electronic transmission control apparatus (EGS) $1$ and a magnetic valve drive unit $2$ connected downstream thereof.

The hydraulic actuators $3$-$1$, $3$-$2$, . . . $3$-$2^n$-$1$ exhibit the property that they are all realized utilizing bistable magnetic valves.

Magnetic valves, in general, include an electromagnet via which an armature and the closure element of the valve are movable in the desired manner. The closure element is connected to the armature.

Bistable magnetic valves have two stable switch positions. If, because of these switch positions, the one state (connecting the input and/or outputs of the valve) and the other state (separating the input and/or outputs of the valve) are defined, the valve can be held without current more or less wide open as well as more or less widely closed without current. Only a more or less short voltage or current pulse is needed in order that the armature and the closure element connected thereto snap from one stable switching position into the other stable switching position.

Conventional hydraulic actuators are realized by not using bistable magnetic valves. In contrast, in the invention, the hydraulic actuators are realized by bistable magnetic valves and each actuator is supplied with current for only a short time.

This has been shown to be advantageous in many aspects, namely:
(a) the energy requirement to actuate the actuator is lower;
(b) the heat caused by the actuation of the actuator is reduced;
(c) the power output stages for actuating the actuators, the input lines to the output stages as well as the connections between the output stages and the actuators must only be designed for short-term loading; and,
(d) the components present in the vicinity of the power output stages can be designed for lower thermal loads.

In addition, and completely independent herefrom, an arrangement containing bistable magnetic valves as hydraulic actuators can be more advantageously built up than this can be done for an arrangement utilizing conventional hydraulic actuators.

For example, and different than previously, a separate output stage must not be provided for each actuator; instead, it is sufficient to provide a common power output stage for several actuators via which the assigned actuators can be actuated simultaneously or sequentially. The sequential actuation of bistable magnetic valves can be a quasi-simultaneous actuation thereof because they must each be supplied with current only for a short time, that is, in rapid sequence.

The power output stages can also be taken out of the transmission control apparatus in which they have always been located up to now and be mounted externally of this apparatus close to the bistable magnetic valve to be driven thereby.

This case is shown in FIG. 1. The power output stages (not shown in FIG. 1) are accommodated in the magnetic valve drive unit 2 which was previously not provided.

The contribution of the transmission control apparatus 1 to the drive of the magnetic valves can, in this way, be limited to transmitting set and reset pulses to the magnetic valve drive unit 2. The magnetic valve drive unit 2 receives these set and reset pulses and causes the power output stage(s) contained therein to correspondingly drive the particular magnetic valve to be actuated.

When the power output stages are arranged outside of the transmission control apparatus (in contrast to the practice to date), then only several or a few common power output stages can be used for several or for all magnetic valves.

Providing the power output stage(s) outside of the transmission control apparatus has proven to be advantageous for the transmission control apparatus in many aspects. Thus, the transmission control apparatus can be made smaller and can be configured for lower powers and lower temperatures.

Furthermore, advantages are provided in this way also for the electrical connections between the transmission control apparatus and the magnetic valves to be controlled thereby, that is, for the section of the cable harness running between the magnetic valves and the transmission control apparatus. Only the connection between the magnetic valve drive unit 2 and the magnetic valves 3-1, 3-2, . . . 3-$2^n$-1 must be designed for high powers. The cable harness section between the transmission control apparatus 1 and the magnetic valve drive unit 2 can be designed for lower powers, that is, it can be dimensioned relatively weaker (smaller line cross section).

The foregoing notwithstanding, and as shown in FIG. 1 and as will be explained in greater detail hereinafter, the section of the cable harness between the transmission control apparatus 1 and the magnetic valve drive unit 2 can include fewer lines than there are magnetic valves to drive.

As shown in FIG. 1, only (n) control lines S1, S2, . . . Sn are provided between the transmission control unit 1 and the magnetic valve drive unit 2 in order to drive the $2^n$-1 magnetic valves via $2^n$-1 control lines SS1, SS2, . . . SS$2^n$-1 between the magnetic valve drive unit 2 and the transmission 3.

Various signal combinations can be transmitted in digitally operating systems $2^n$ via the (n) control lines S1, S2, . . . Sn. This number of signal combinations is precisely sufficient in order to be able to selectively drive the $2^n$-1 magnetic valves. A logic circuit is required for decoding the signal combinations transmitted via the control lines S1, S2, . . . Sn. This logic circuit is contained in the magnetic valve drive unit 2.

This is explained in the following with respect to FIG. 2 wherein a possible internal configuration of the arrangement shown in FIG. 1 is presented.

Figure 2:
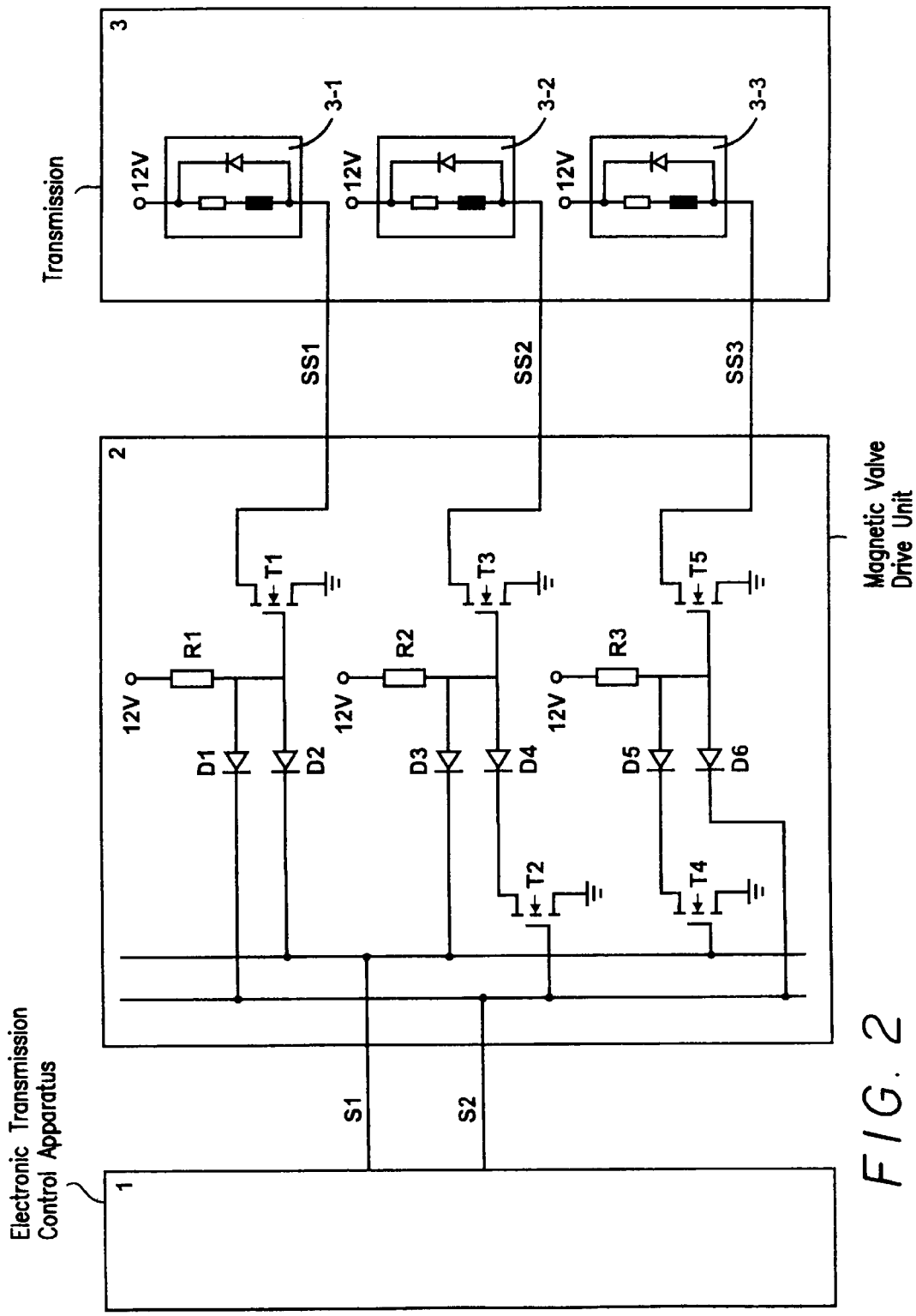

In the arrangement shown in FIG. 2, the value "2" is selected for the variable "n", which is used in FIG. 1, for the sake of clarity, that is:
(a) the transmission 3 contains three bistable magnetic valves 3-1, 3-2 and 3-3 which are to be driven;
(b) the transmission control apparatus 1 is connected to the magnetic valve drive unit 2 via two control lines S1 and S2; and,
(c) the magnetic valve drive unit 2 is connected via three control lines SS1, SS2 and SS3 to the transmission 3, more specifically, to the bistable magnetic valves 3-1, 3-2 and 3-3 contained therein.

The bistable magnetic valves are shown in FIG. 2 via their electric equivalent circuit. In this equivalent circuit, the bistable magnetic valves can be treated as coils with a resister connected in series and a parallel diode.

The magnetic valve drive unit 2 includes a separate power output stage in the form of transistors (n-channel-FETs) T1, T3 and T5 for each of the magnetic valves 3-1, 3-2 and 3-3.

The magnetic valve drive unit 2 further includes a logic circuit to decode the signal combinations received via the control lines S1 and S2 and to selectively actuate the magnetic valves 3-1, 3-2 and 3-3, which are addressed in each case, via the assigned power output stages T1, T3 and T5 as well as the signal lines SS1, SS2 and SS3. The logic circuit comprises diodes D1 to D6, resistors R1 to R3 and transistors (n-channel-FETs) T2 and T4 which are connected as shown in FIG. 2. The diodes D1, D2 and the resistor R1 as well as the diodes D3, D4 and the resistor R2 as well as the diodes D5, D6 and the resistor R3 each define a logic AND-element. The transistors T2 and T4 are effective each as an inverter. The logic circuit can be replaced with an integrated circuit such as the 74HCl38.

As shown in the circuit of FIG. 2:
(a) the first power output stage (transistor T1) is activated when and as long as a set pulse or reset pulse is transmitted on the two control lines S1 and S2;

(b) the second power output stage (transistor T3) is activated when and as long as a set or reset pulse is transmitted only on the second control line S2;

(c) the third power output stage (transistor T5) is activated when and as long as a set or reset pulse is transmitted only on the first control line S1; and, (d) no power output stage is activated when and as long as a set or reset pulse is transmitted on none of the two control lines S1 and S2.

When and as long as the power output stages are activated, current is caused to flow through the particular allocated magnetic valve. With this flow of current, the particular magnetic valve is switched over from the switch position, which it just had, into the other switch position. The new switch position will remain even after the end of the flow of current in the affected magnetic valve because these magnetic valves are bistable magnetic valves. The time during which the magnetic valve is provided with current can be very short, that is, for example, a few milliseconds. This short time during which current flows makes it possible to switch over and hold in the switched over position of several magnetic valves quasi simultaneously in the desired manner even though (at least with respect to the embodiment of FIG. 2) only a single one of the magnetic valves is provided with current at a specific time point.

From the foregoing, it becomes clear that the use of bistable magnetic valves to realize hydraulic switching elements as well as the described methods and arrangements for driving the same permits a plurality of significant advantages to be realized individually and in combination.

It is understood that the foregoing description is that of the preferred embodiments of the invention and that various changes and modifications may be made thereto without departing from the spirit and scope of the invention as defined in the appended claims.

What is claimed is:

1. An arrangement for a motor vehicle incorporating hydraulic actuator means, the arrangement comprising:

said hydraulic actuator means being a plurality of bistable magnetic valves (3-1, 3-2 . . . 3-$2^n$-1);

circuit means including power output stages common to selected ones of said bistable magnetic valves; and, said power output stages being configured to supply a short voltage or current pulse to said bistable magnetic valves (3-1, 3-2 . . . 3-$2^n$-1).

2. The arrangement of claim 1, further comprising:

each of said bistable magnetic valves being switchable between a first stable switching position and a second stable switching position; and, each of said bistable magnetic valves being adapted to respond to said pulses to switch from one of said positions to the other end of said positions.

3. The arrangement of claim 2, said circuit means comprising power output stage means for driving said bistable magnetic valves.

4. The arrangement of claim 3, said circuit means comprising a plurality of power output stages for driving corresponding ones of said bistable magnetic valves.

5. The arrangement of claim 3, further comprising switching means for connecting said common power output stages to selected ones of said bistable magnetic valves.

6. An arrangement for a motor vehicle incorporating hydraulic actuator means, the arrangement comprising:

said hydraulic actuator means being a plurality of bistable magnetic valves (3-1, 3-2 . . . 3-$2^n$-1);

power output stage means for supplying a short voltage or current pulse to said bistable magnetic valves (3-1, 3-2 . . . 3-$2^n$-1);

a control apparatus for controlling said bistable magnetic valves via said power output stage means; and, said power output stage means being outside of said control apparatus.

7. The arrangement of claim 6, further comprising a magnetic valve drive unit connected to said control apparatus and said magnetic valve drive unit being in close proximity to said bistable magnetic valves; and, said power output stage means being disposed in said magnetic valve drive unit.

8. The arrangement of claim 7, said control apparatus being configured to transmit pull-in and reset pulses to said magnetic valve drive unit.

9. The arrangement of claim 8, wherein at least a portion of said bistable magnetic valves are to be actuated simultaneously; and, said pull-in and reset pulses are transmitted sequentially to said portion of said bistable magnetic valves.

* * * * *